US006418362B1

(12) United States Patent
St. Pierre et al.

(10) Patent No.: US 6,418,362 B1
(45) Date of Patent: Jul. 9, 2002

(54) STEERING WHEEL INTERFACE FOR VEHICLES

(75) Inventors: Robert P. St. Pierre, Sunnyvale, CA (US); Mark J. Koch, Westminster, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/697,857

(22) Filed: Oct. 27, 2000

(51) Int. Cl.[7] .................................................. G06F 7/00
(52) U.S. Cl. ......................................... 701/36; 280/778
(58) Field of Search .................... 701/35, 36; 74/484 R; D12/175; 280/778

(56) References Cited

U.S. PATENT DOCUMENTS

| | | | |
|---|---|---|---|
| 5,319,803 A | 6/1994 | Allen | 455/89 |
| 5,749,577 A | 5/1998 | Couch et al. | 273/148 B |
| 5,855,144 A | 1/1999 | Parada | 74/552 |

*Primary Examiner*—Yonel Beaulieu
(74) *Attorney, Agent, or Firm*—Lahive & Cockfield, LLP (57) ABSTRACT

A method and apparatus for enabling a user/driver of a vehicle to interact with and manipulate a pointer on a display screen of a computer is presented. The interface device is generally mounted in a steering wheel of the vehicle. The device typically includes at least one user input mechanism in the form of a thumb input pad positioned on a modified grip portion of the steering wheel, and at least one input button positioned on a back side of the steering wheel grip. The thumb input pad is reachable by a thumb of a vehicle driver, and the at least one input button is reachable by a finger of the vehicle driver when the driver has positioned his or her hand in a common driving position. The pointer that is being controlled by the various forms of interface device, scrolls across the particular display screen provided in the particular vehicle, and is utilized in making selections and carrying out computer functions.

25 Claims, 5 Drawing Sheets

STEERING WHEEL INTERFACE FOR VEHICLES

FIELD OF THE INVENTION

The invention relates to an input device for computers, and more particularly to a controller for directing a pointer on a computer display screen in a vehicle.

BACKGROUND OF THE INVENTION

In a conventional vehicle, there are a multitude of features and controls that relate to vehicle performance as well as occupant comfort. Most typically, the dashboard display includes separate items such as a speedometer, fuel gage, water temperature, and possibly tachometer. The dashboard display also includes several warning lights including, e.g., oil pressure, water temperature, low fuel, hazard lights, high beam lights, turn signal indicators, windshield washer fluid, and potentially additional items such as anti-lock brake action, traction control status, and airbag status.

To date, one feature sometimes offered by several automobile manufacturers is that of multiple button actuators positioned in various locations on a vehicle's steering wheel to control some of the automobile's features and systems. The buttons are hardwired directly to the vehicle components. Some example features that follow this convention include cruise control, and redundant stereo system controls such as, e.g., tuner, volume control, and CD player controls. If the driver of the vehicle wishes to tune the radio, they simply utilize the controls on the steering wheel, rather than taking their hand off the steering wheel to adjust controls in a center console area. Reaching to the center console turns the driver's attention away from the act of driving, which ultimately affects overall occupant safety.

Therefore, it is desirable to provide the driver of a vehicle with the ability to control as many vehicle features and systems as possible directly from the steering wheel. One potential pitfall in such an initiative includes the likelihood of a mass of too many wires passing through the steering wheel, and steering wheel column, from each of the button actuators to the dashboard. There is a limited amount of space in a steering wheel and column, and the additional requirement that the steering wheel be able to rotate without hindrance from the wires remains in the forefront of vehicle design because of its direct link with safety and vehicle control. An additional pitfall is that the steering wheel becomes too cluttered with actuator buttons, each button having its own unique vehicle feature or system that it controls. If the vehicle driver is unable to manipulate the actuator buttons on the steering wheel without looking at them, then some of the additional safety characteristics of steering wheel controls are lost because the driver's attention would once again depart from the act of driving the vehicle, and instead focus on figuring out which actuator button to press.

SUMMARY OF THE INVENTION

For the foregoing reasons, there exists in the art a need for an interface between a multitude of vehicle controls and a vehicle driver in a manner that does not clutter a vehicle steering wheel, complicate a vehicle dashboard display, or unnecessarily distract a vehicle driver from the act of driving. The present invention is directed toward further solutions in this art.

For the example embodiments of the present invention to be most useful, the many gages on the dashboard display are replaced with a computer driven display screen. Then, in accordance with one example embodiment of the present invention, a user interface device is provided for electronic manipulation of a pointer on the display screen of the computer in a vehicle. The interface device generally mounts in a steering wheel of the vehicle. In one embodiment, the device includes user input mechanisms in the form of at least one thumb input pad positioned on a grip portion of the steering wheel, and at least one input button positioned on a back side of the steering wheel grip. The thumb input pad is reachable by a thumb of a vehicle driver when the driver positions his or her hand in a common driving position. For example, in one embodiment the interface device is reachable by a thumb of a driver when the driver positions their left-hand on the grip of the steering wheel in, e.g., approximately a 9 o'clock to 10 o'clock position relative to the steering wheel while the steering wheel is in a neutral position. Alternatively, the interface device is reachable by a thumb of the driver when the driver positions their right-hand on the grip of the steering wheel in, e.g., approximately a 2 o'clock to 3 o'clock position relative to the steering wheel while the steering wheel is in a neutral position.

In a similar manner to the thumb input pad, according to one embodiment of the present invention at least one input button is reachable by a finger of the driver when the driver positions their left-hand on the grip of the steering wheel at, e.g., approximately a 9 o'clock to 10 o'clock position relative to the steering wheel while the steering wheel is in a neutral position. Further, according to another embodiment, at least one input button is reachable by a finger of the driver when the driver positions their right-hand on the grip of the steering wheel in, e.g., approximately a 2 o'clock to 3 o'clock position relative to the steering wheel while the steering wheel is in a neutral position.

Other positions of both the thumb input pad, and the one or more input buttons on various locations of the steering wheel are also possible in accordance with the present invention. Further, the steering wheel itself can be positioned in any location of the vehicle for driving purposes, most commonly in the left, middle, or right front of the passenger cabin.

In accordance with several embodiments of the present invention, the thumb input pad can be of different types of actuator mechanisms. For example, the thumb input pad can be one of, e.g., a disc actuator, a joystick, a track ball, or a digital touch pad. In further embodiments there can be more than one thumb input pad as well as, e.g., one, two, or three input buttons positioned on the back side of the steering wheel grip. In an arrangement where there is a plurality of input buttons, each button can have on its surface different raised embossed symbols to identify each button. Alternatively, the symbols can be etched into the surface of each button. Further, each button itself can be of a different identifying shape.

In one aspect of the invention the interface device includes a microprocessor. In a further aspect of the present invention a signal transmitter, such as, an e.g., an RF signal transmitter, or infrared signal transmitter, is provided, which is in electronic communication with the microprocessor, the thumb input pad, and at least one input button. Accordingly, there is at least one input signal receiver for each signal transmitter. Depending on the form of signal coming from the transmitter, the signal receiver is, e.g., an RF signal receiver or an infrared signal receiver. The signal receiver is in electronic communication with the display screen.

In further embodiments of the invention, the display screen is a Liquid Crystal Display screen positioned on the dashboard of the vehicle. Alternatively, the display screen can be an interior surface of a windshield of the vehicle, upon which a desired image is projected.

In all instances, the pointer that is being controlled by the various forms of interface device, scrolls across the particular display screen provided in the particular vehicle, makes selections, and carries out computer functions, under direction of the driver.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

The present invention generally relates to a driver interface with a pointer on a computer display screen in a vehicle. The interface includes at least one user input mechanism illustrated herein as at least one thumb input pad and at least one, typically a plurality, of input buttons located on a back side of a steering wheel. The thumb input pad and input buttons are in communication with a pointer on a display screen of a central computer. This allows the driver to manipulate the position and function of the pointer on the display screen without removing his or her hands from the steering wheel. The driver is less distracted from the act of driving when they are attempting to also manipulate the pointer, thus creating a safer approach to the use of a single display screen in place of the plurality of dashboard gages in a vehicle.

Referring now in detail to the drawings wherein like parts are designated by like reference numerals throughout, FIGS. 1–10 illustrate example embodiments of a user interface device 11 and system for electronic manipulation of the pointer 35 on the display screen 34 of at least one computer 36 in a vehicle 40. Although the present invention will be described with reference to the example embodiments illustrated in the figures, it should be understood that the present invention can be embodied in many alternative forms. In addition, any suitable size, shape, or type of elements or materials can be utilized.

Figure 1:
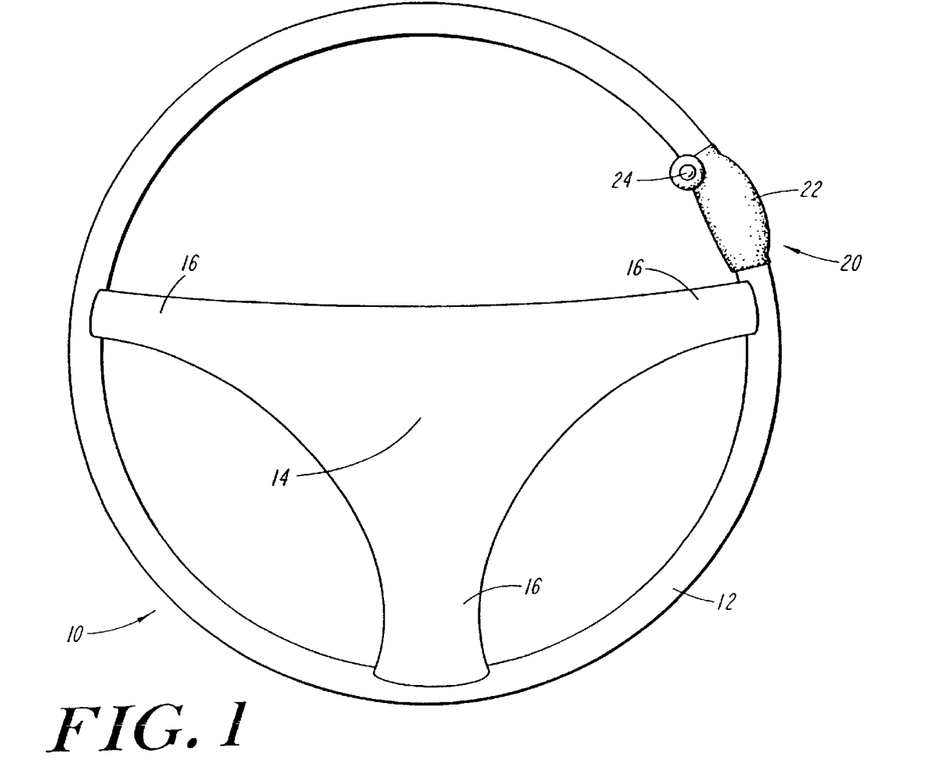
FIG. 1 is a perspective view of a steering wheel hosting an interface device according to one embodiment of the present invention.

As seen in FIG. 1, a steering wheel 10 has a steering wheel grip 12, which forms the outer circumference of the circular structure of the steering wheel. There is at least one (typically three) steering wheel spoke 16, which extends from the steering wheel grip 12 to a steering wheel center section 14. Within the steering wheel center section 14, manufacturers often include such features as an air bag safety system, at least one button for a vehicle horn, as well as additional buttons for controlling such items as a vehicle cruise control, or stereo controls. All of these systems are hard-wired into the vehicle, the physical electrical connections being made through a steering wheel column 18 (see FIGS. 5 & 6). The vehicle 40 envisioned according to the illustrative embodiment of present invention is a common passenger vehicle, such as, e.g., sedan, coupe, hatchback, wagon, SUV, etc. However, it should be noted that embodiments of the present invention are equally suitable for other vehicles, such as, e.g., boats, airplanes, buses, delivery trucks, semi-trucks, all classes of military vehicles, trains, subways, etc., and therefore should not be limited to the passenger vehicle example most commonly depicted herein. Further, the steering wheel 10 can be in any number of different locations, including left, middle, and right sides of the vehicle 40.

In one embodiment of the present invention, and as illustrated in FIGS. 1–4, the steering wheel 10 has a modified grip 20 covering a subsection of the steering wheel grip 12. The modified grip 20 is not a requirement of embodiments of the present invention to the extent that it changes the shape of the steering wheel grip 12. However, in the particular embodiments illustrated herein, the modified grip 20 is provided to aid the driver in positioning their hand appropriately to easily find the various components of the illustrated invention, such as, a thumb input pad 24 and input buttons 26. The components of the present invention can coexist with a predetermined steering wheel 10 design. In an example embodiment, the modified grip 20 includes a palm support 22 for additionally supporting a driver's hand while they utilize the interface device 11.

Figure 2:
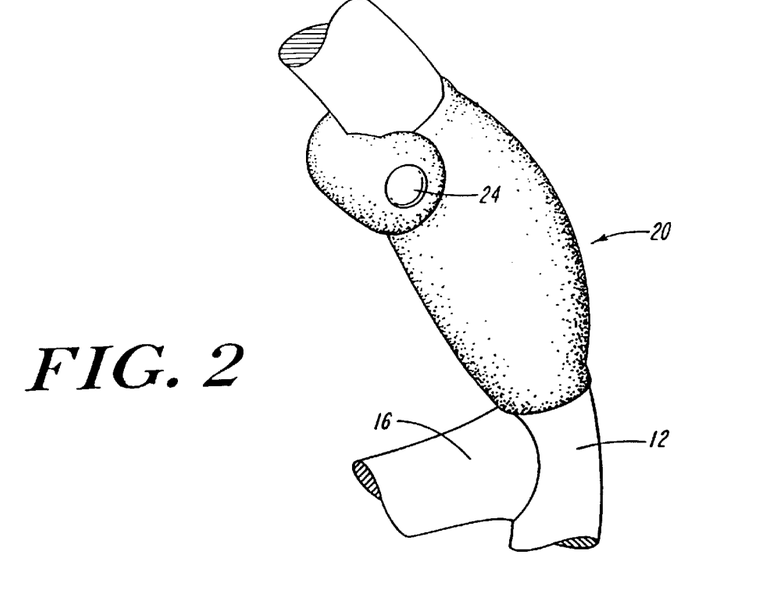
FIG. 2 is a magnified view of the interface device according to one embodiment of the present invention.
Figure 3:
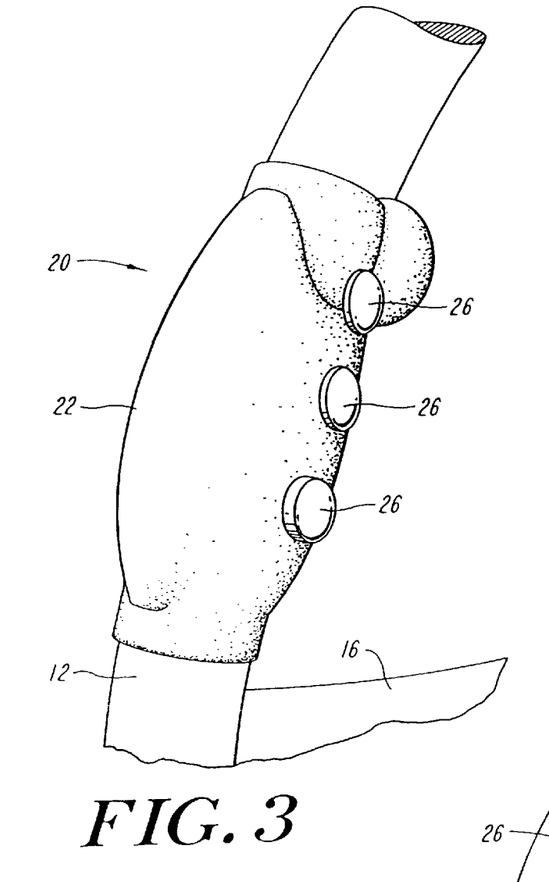
FIG. 3 is a view of a back side of the interface device according to one embodiment of the present invention.
Figure 4:
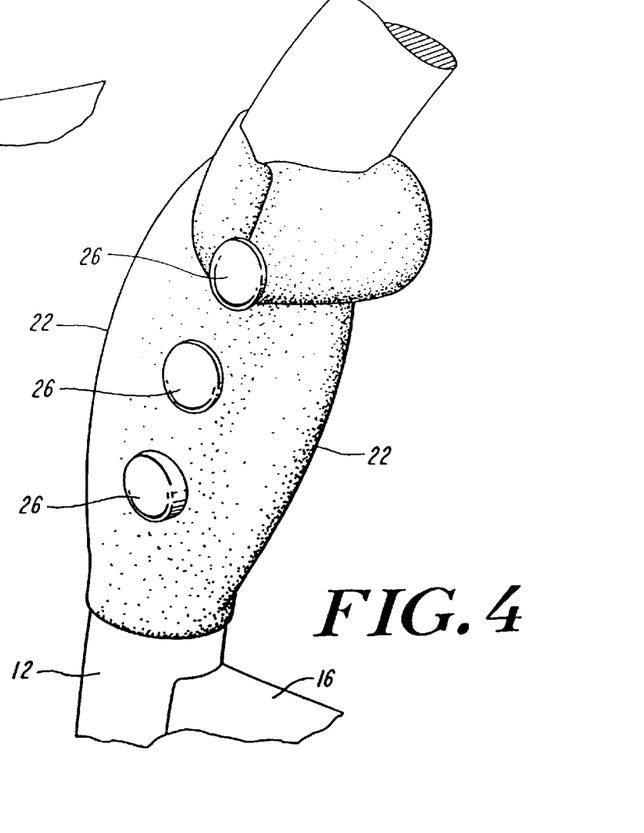
FIG. 4 is a perspective view of input buttons according to one embodiment of the present invention.
Figure 5:
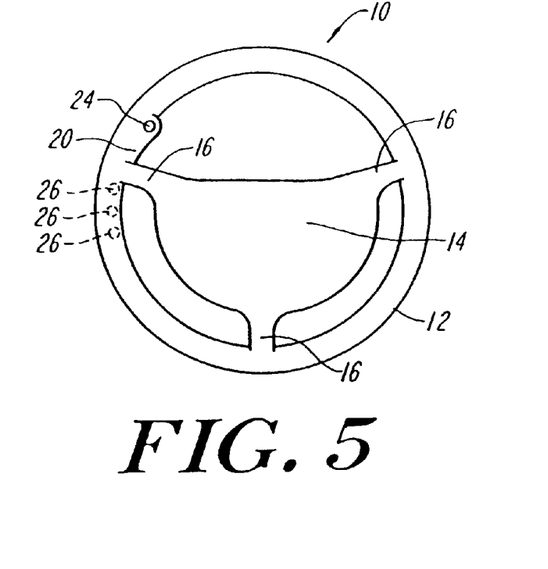
FIG. 5 is a schematic diagram of a steering hosting the interface device on a left-hand side according to one embodiment of the present invention.
Figure 6:
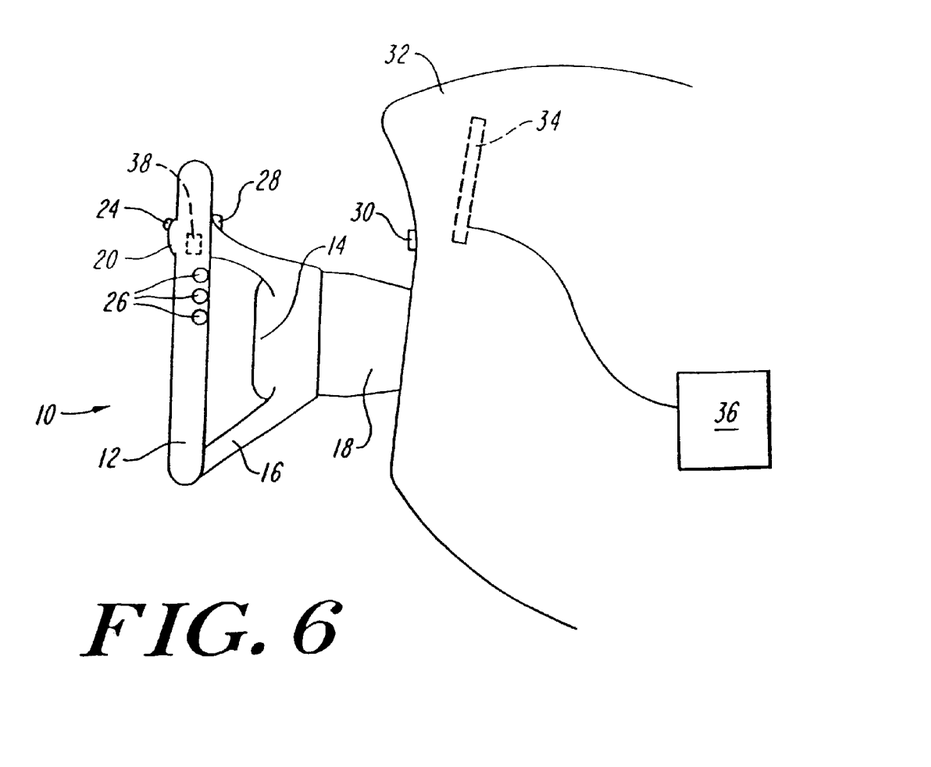
FIG. 6 is a schematic side view of an interface system according to one embodiment of the present invention.
Figure 7A:
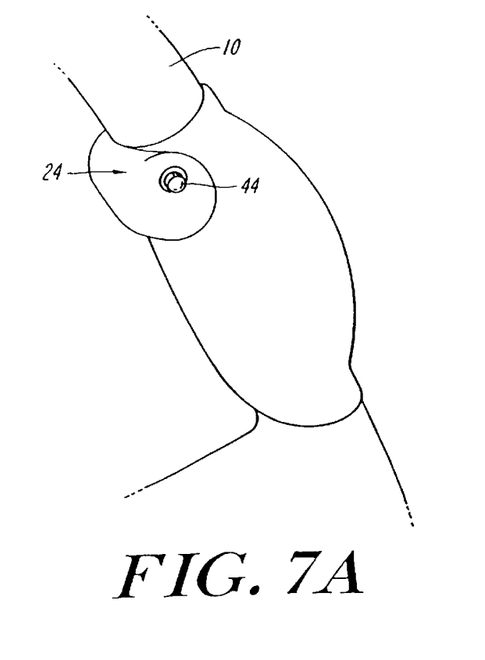
FIGS. 7A, 7B, 7C, and 7D are perspective views of example thumb input pads according to several embodiments of the present invention.
Figure 7B:
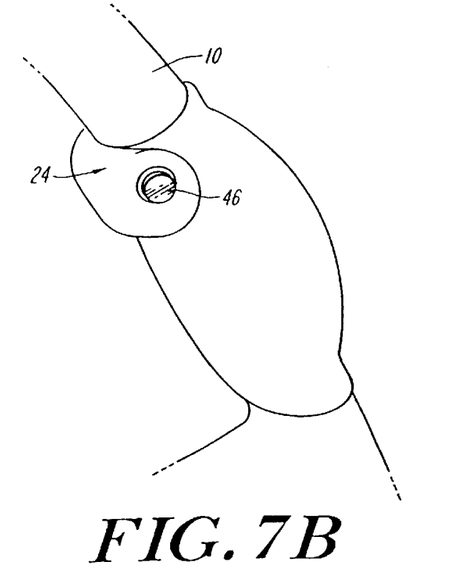
Figure 7C:
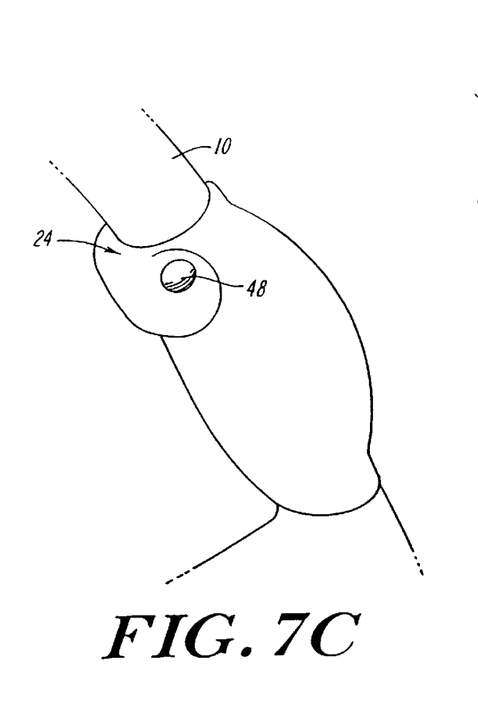
Figure 7D:
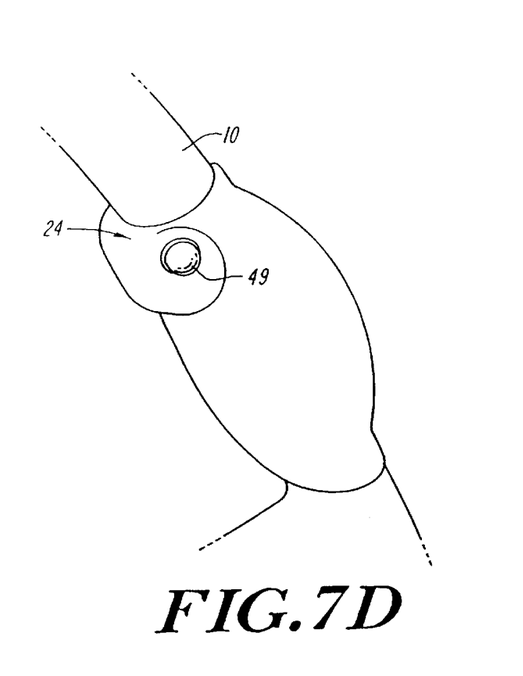
Figure 8:
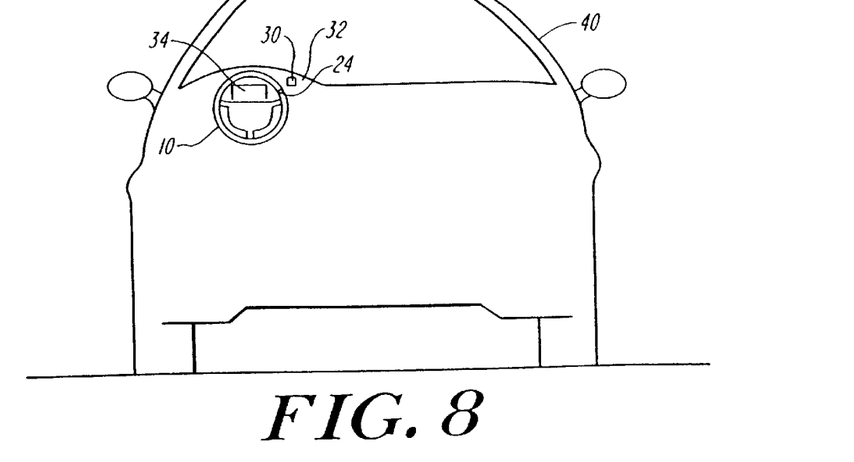
FIG. 8 is a schematic view of an example installation location of the present invention according to one embodiment of the present invention.

The thumb input pad 24 is provided toward an upper end of the modified grip 20. More importantly, the thumb input pad 24 is located in a position where a thumb of a driver can reach the thumb input pad 24 when the driver positions their hands in a common driving position. For example, if the thumb input pad 24 is on a left side of the steering wheel 10, then the driver positions their left hand in approximately the 9 o'clock to 10 o'clock position along the steering wheel 10, when the steering wheel is in a neutral position. This allows the user to reach the thumb input pad 24 with their thumb without moving their hand from the steering wheel grip 12. Alternatively, if the thumb input pad 24 is positioned on a right side of the steering wheel 10, then the user places their right hand in approximately the 2 o'clock to 3 o'clock position along the steering wheel 10 while the steering wheel 10 is in a neutral position. Again, this allows the driver to reach the thumb input pad 24 with the thumb of their right hand without having to remove their hand from the steering wheel 10. The locations of the driver's hands can vary. The positions described above are simply the preferred hand positions for driving a vehicle with a steering wheel 10, as commonly known. However, some individuals may position one or both of their hands in, e.g., a 7 o'clock to 8 o'clock position, or a 4 o'clock to 5 o'clock position.

The position of the present invention on the steering wheel 10 is primarily directed by the ability of the driver to easily reach the various pads 24, and buttons 26 without needing to remove their hand or hands from the steering wheel 10.

As illustrated in FIGS. 7A, 7B, 7C, and 7D the technology of the thumb input pad 24 can vary. For example, the thumb input pad 24 can be a joystick 44, a disse-shaped actuator 46, a touch pad 48, or a trackball 49. Each form of technology allows the driver to move the pointer 35 along the display screen 34 with only minor movements of their thumb in conjunction with the particular input pad 24 technology. Typically, a movement in an upward direction relative to the driver will move the pointer 35 in an upward direction on the display screen 34. Likewise, gestures or minor movements of the thumb input pad 24 in left, right, and downward directions, or any direction in-between, will accordingly move the pointer 35 in a respective direction on the display screen 34.

On a back side of the steering wheel 10 is at least one input button 26. In FIGS. 3, 4, 5, and 6, there are three input buttons 26 shown. The actual number of input buttons 26 can vary from one to, for example, five, depending on the number of functions desired of the interface devices 11.

Once again, the input buttons 26 are positioned on the back side of the steering wheel 10 proximal to the thumb input pad 24. Therefore, when the driver positions their hands on the steering wheel in, e.g., either the 9 o'clock to 10 o'clock position or the 2 o'clock to 3 o'clock position depending on the side of the steering that the input buttons 26 mount, the driver can easily reach the input buttons 26 with their fingers without having to remove their hand from the steering wheel 10.

The input buttons 26 illustrated are shown as substantially round-shaped buttons. However, the actual shape of the button 26 can vary to distinguish one input button 26 from another. For example, if there are three input buttons 26, each of the input buttons 26 could be one of a circle, a square, and a triangle. The actual shape of the input button 26 is not limited to these shapes but can be practically any shape that would fit in the same relative space as those input buttons 26 illustrated. For example, there may be a telephone shape, a magnifying glass shape, an hourglass shape, etc., depending on the function of the input button 26 and the desire to differentiate. Because a driver cannot generally see the backside of the steering wheel 10, the different shapes serve as an aid in determining which input button 26 the driver has their finger on at any one time. Using their sense of feel, the driver can distinguish each of the input button 26 shapes, thus instantly knowing which input button 26 they are about to press. In addition, the modified grip 20 can include depressions or valleys (not shown) leading from the palm support 22 to the input buttons 26. The depressions are designed to cradle each finger and guide the finger to the input buttons 26.

Instead of, or in addition to, the different input button 26 shapes, the surface of the input button 26 itself can include a symbol to additionally distinguish the particular input button 26. The symbol can be placed on the button in, e.g., a raised/embossed application, or in a recessed/engraved type of application. The particular symbol utilized may vary from familiar shapes such as, e.g., the telephone, magnifying glass, or hourglass shapes, to, e.g., Braille codes. This allows the driver to distinguish the particular input button 26 by how the symbol feels to the driver's fingertip.

In an example embodiment, the thumb input pad 24 and the input button or buttons 26, are in electronic communication with a microprocessor 38 and a transmitter 28. The microprocessor 38 is contained within, e.g., the modified grip 20 or the steering wheel 10 itself. As the driver utilizes the thumb input pad 24 or the input button or buttons 26, a signal is provided to the microprocessor 38 which ultimately communicates with a transmitter 28 to send another signal to a receiver 30 located on or within, for example, a vehicle dashboard 32

According to one example embodiment of the present invention the transmitter 28 is of the type that transmits RF signals to an RF-type receiver 30. According to another embodiment of the present invention the transmitter 28 is of the type that transmits infrared signals to an infrared-type receiver 30. Other types of signals can be utilized, e.g., optical signals, digital signals, or other signaling forms not specified herein, however, the RF signal or the infrared signal is preferred. One particular attribute of both the RF signal and the infrared signal is that in both formats there are no hard wire connections between the transmitter 28 and the receiver 30. Therefore, there is no requirement for wires to run from the steering wheel 10 through the steering wheel column 18 and into the dashboard 32 where the receiver 30 is positioned. This makes the installation-of the interface device 11 easier as well as reducing the likelihood of a faulty or disconnected wire through the steering column 18. Although this feature is considered advantageous by the inventors, there may be instances where hard wire connections are preferable. The present invention does not exclude such scenarios or circumstances.

As the driver manipulates the thumb input pad 24 and the input buttons 26, the signal is transmitted from the transmitter 28 to the receiver 30 thereby manipulating the pointer 35 on the display screen 34 of the particular computer 36 installed in the vehicle 40. Thus, the driver has complete control over the pointer 35 and can move the pointer 35 anywhere across the particular display screen 34 and make selections with the input buttons 26. In particular, in one example embodiment having three input buttons 26, the functionality of each button is similar to that of a conventional mouse controller. For example, the first of the input buttons 26 has equivalent features to a left-hand button of a conventional mouse. These features may include a one-click or two-click selection feature. The second of the input buttons 26 has equivalent features to a middle button of a conventional mouse. These features may include the ability to program the specific button for "help" information, or e.g., automatic double-click. The third input button 26 has equivalent features to a right-hand button of a conventional mouse. This may include the feature of a pop-up menu of options including "properties" and "help" type information. Thus, if a driver has any familiarity with, e.g., either a Mac® or Windows® brand operating system, and has used a conventional mouse in the past, it is anticipated that the transition to the interface device 11 of the present invention would cause little conceptual difficulty with regard to the input button 26 and the thumb input pad 24 functions. One advantage gained here is that a driver of a vehicle 40 utilizing an embodiment of the present invention will not need to learn a new and different control logic to operate the vehicle computer 36.

Figure 9A:
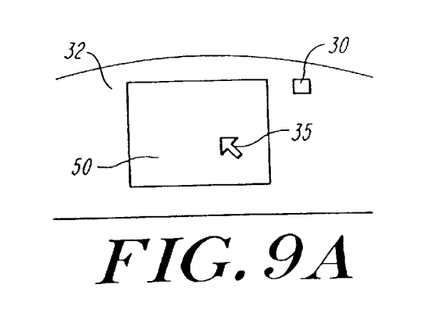
FIGS. 9A and 9B are schematic views of example display screens according to example embodiments of the present invention.
Figure 9B:
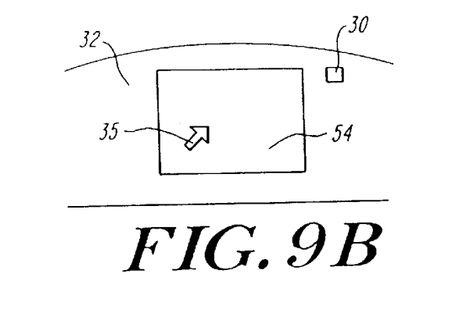
Figure 10:
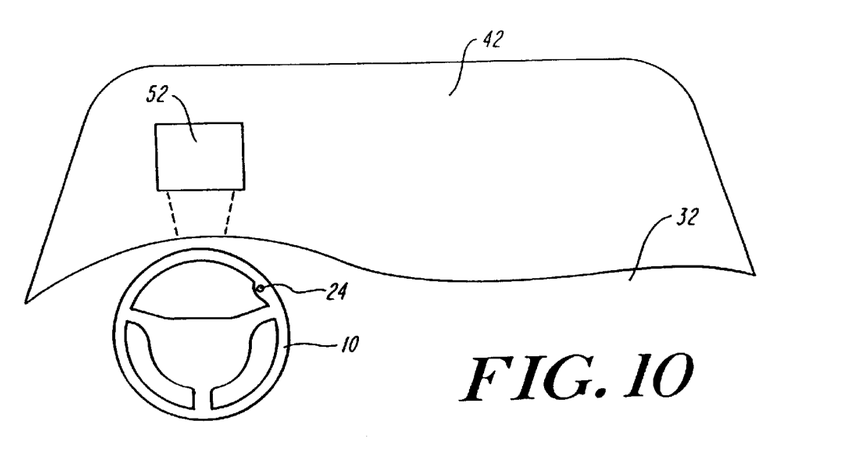
FIG. 10 is a schematic of another example display screen according to one embodiment of the present invention.

As previously stated, the pointer 35 moves across the particular display screen 34 in communication with the computer 36. The display screen 34 can be of several different technologies as well. For most of the technologies, the display screen 34 can fit within the dashboard 32 in front of the driver (see FIG. 8). For example, as illustrated in FIGS. 9a and 9b, the display screen 34 is of a Liquid Crystal Display ("LCD.") type display 50, or a plasma-type display 54. Alternatively, as illustrated in FIG. 10, the display screen 34 can be of a projection-type display 52, wherein the actual display screen is an interior side of the windshield 42, and the display is projected onto the windshield 42. Such a display format is known as a heads-up display ("HUD"). Other possible screen technologies include active matrix TFT, as well as plasma Screen displays. Once again, the position of the display screen 34 and the particular technology utilized is chosen partially based on an awareness of safety for the driver of the vehicle 40. With the LCD-type display 50 located in a central area of the dashboard 32, or the projection display 52 located directly in the driver's line of sight, there is less of a need for the driver to avert their eyes from the road. This helps in reducing otherwise creating more dangerous driving conditions.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. An interface device for electronic manipulation of a pointer on a display screen in a vehicle, comprising;
    at least one user input mechanism mounted on a steering wheel of said vehicle; and
    a control device in communication with said at least one user input mechanism and said display screen, wherein said control device translates user input to said input mechanism into actions of said pointer on said display screen.

2. The interface device according to claim 1, wherein said user input mechanism by one of a thumb and a finger of a user when said user has positioned a hand on a grip of said steering wheel in approximately a common driving position.

3. The interface device according to claim 1, wherein said user input mechanism is at least one of a disc shaped actuator, a joystick, a track ball, a touch pad, and a button.

4. The interface device according to claim 3, wherein said user input mechanism includes a plurality of buttons, and each button is of a different shape.

5. The interface device according to claim 3, wherein said user input mechanism includes a plurality of buttons, and each button has a differentiating surface.

6. The interface device according to claim 1, wherein said control device is a microprocessor.

7. The interface device according to claim 6, further comprising a signal transmitter for transmitting RF signals, said transmitter being in electronic communication with said microprocessor and said at least one user input mechanism.

8. The interface device according to claim 7, further comprising a signal receiver for receiving RF signals, said receiver being in electronic communication with said display screen.

9. The interface device according to claim 6, further comprising a signal transmitter for transmitting infrared signals, said transmitter being in electronic communication with said microprocessor, and said at least one user input mechanism.

10. The interface device according to claim 9, further comprising a signal receiver for receiving infrared signals, said receiver being in electronic communication with said display screen.

11. The interface device according to claim 1, wherein said display screen is one of an LCD screen positioned in a dashboard of said vehicle, an interior surface of a windshield of said vehicle upon which a desired image is projected, and a plasma screen positioned in said dashboard of said vehicle.

12. A user interface device for electronic manipulation of a pointer on a display screen of at least one computer in a vehicle, said interface device mounted in a steering wheel of said vehicle and comprising:
    at least one thumb input pad positioned on a grip of said steering wheel; and
    at least one input button positioned on a backside of said grip.

13. The interface device according to claim 12, wherein said at least one thumb input pad is reachable by a thumb of said user when said user has positioned a hand on said grip of said steering wheel in approximately a common driving position.

14. The interface device according to claim 12, wherein said at least one input button is reachable by a finger of said user when said user has positioned a hand on said grip of said steering wheel in approximately a common driving position.

15. The interface device according to claim 12, wherein said thumb input pad is one of a disc-shaped actuator, a joystick, a track ball, and a touch pad.

16. The interface device according to claim 12, wherein said device includes a plurality of input buttons, and each button of said plurality is of a different identifying shape.

17. The interface device according to claim 12, wherein said device includes a plurality of input buttons, and each button of said plurality has a different identifying surface.

18. The interface device according to claim 12, further comprising a microprocessor.

19. The interface device according to claim 12, further comprising a signal transmitter for transmitting one of RF signals and infrared signals, said transmitter being in electronic communication with said microprocessor, said thumb input pad, and said at least one input button.

20. The interface device according to claim 16, further comprising a signal receiver for receiving one of RF signals and infrared signals, said receiver being in electronic communication with said display screen.

21. The interface device according to claim 1, wherein said display screen is one of an LCD screen positioned on a dashboard of said vehicle, an interior surface of a windshield of said vehicle upon which a desired image is projected, and a plasma screen positioned on said dashboard of said vehicle.

22. A user interface system for electronic manipulation of a pointer on a display screen of at least one computer in a vehicle, said interface system mounted in a steering wheel of said vehicle and comprising:
    at least one thumb input pad positioned along a grip of said steering wheel;
    at least one input button positioned along a backside of said grip relative to a driver of said vehicle;
    a microprocessor;
    a signal transmitter positioned on said steering wheel and electronically coupled with said microprocessor, said thumb input pad, and said at least one input button; and
    a signal receiver mounted on a vehicle dashboard panel relatively in front of said driver of said vehicle, said signal receiver in electronic communication with said display screen.

23. The interface system according to claim 22, wherein said signal transmitter has a physical electronic connection with said signal receiver.

24. The interface system according to claim 22, wherein said signal transmitter utilizes one of RF frequencies and infrared signals to communicate with said signal receiver.

25. A method of manipulation by a user of a pointer on a display screen of at least one computer in a vehicle, comprising the steps of:

moving said pointer to desired locations on said display screen by direction of a user's thumb on a thumb input pad, said thumb input pad positioned on a steering wheel grip; and carrying out desired functions on said display by depression of at least one input button by a user's finger, said at least one input button positioned on a back side of said steering wheel grip relative to said user.

\* \* \* \* \*